United States Patent [19]
Wunram

[11] Patent Number: 6,001,285
[45] Date of Patent: Dec. 14, 1999

[54] FIRE-RETARDANT MATERIAL AND A METHOD FOR THE MANUFACTURE OF SUCH A MATERIAL

[75] Inventor: Heinz-Peter Wunram, Reichshof-Hahn, Germany

[73] Assignee: B & F Formulier- und Abfuell GmbH, Drolshagen-Iseringhausen, Germany

[21] Appl. No.: 08/907,144

[22] Filed: Aug. 6, 1997

[30] Foreign Application Priority Data

Aug. 7, 1996 [DE] Germany ............................ 196 31 813

[51] Int. Cl.$^6$ ............................ C09K 21/04; C09K 21/12
[52] U.S. Cl. ........................ 252/606; 252/601; 252/602; 252/605
[58] Field of Search ...................... 252/601, 602, 252/605, 606

[56] References Cited

U.S. PATENT DOCUMENTS

| | | | |
|---|---|---|---|
| 4,166,743 | 9/1979 | Wortmann et al. | 252/8.1 |
| 4,247,435 | 1/1981 | Kasten | 260/29.6 MP |
| 4,529,467 | 7/1985 | Ward et al. | 156/307.3 |
| 4,543,281 | 9/1985 | Pedersen et al. | 438/36 |
| 4,588,510 | 5/1986 | Salyer et al. | 252/5 |
| 5,175,197 | 12/1992 | Gestner et al. | 523/218 |
| 5,182,049 | 1/1993 | Von Bonin | 252/378 R |
| 5,185,103 | 2/1993 | Eswarakrishman et al. | 252/606 |

FOREIGN PATENT DOCUMENTS

| | | |
|---|---|---|
| 41 01 539 | 7/1992 | Germany . |
| 43 11 794 | 10/1994 | Germany . |
| 93/05118 | 3/1993 | WIPO . |

*Primary Examiner*—Blaine Copenheaver
*Attorney, Agent, or Firm*—Flynn, Thiel, Boutell & Tanis, P.C.

[57] ABSTRACT

Intumescing materials for the fighting of fire or the prevention of damage resulting from fires are, as a rule, packaged in cartouches, from which they are removed for processing at building sites or the like. Their processing ability is limited because they harden to a rubberlike state with time. However, according to the invention, their spreading ability is maintained when a specific amount of a cellulose is added to the material.

18 Claims, No Drawings

FIRE-RETARDANT MATERIAL AND A METHOD FOR THE MANUFACTURE OF SUCH A MATERIAL

FIELD OF THE INVENTION

The invention relates to a fire-retardant material which intumesces at an elevated surrounding temperature and a method for the manufacture of such a fire-retardant material.

BACKGROUND OF THE INVENTION

It is already known to use intumescing materials in cable channels as a fire-protecting material, via spreadable and/or sprayable application, which at a temperature significantly exceeding the room temperature foams up to a deformation-resistant, fire-retardant foam corpus heat-insulating the inside of the channel. Such a material is available, for example, under the Trade Name "Pyro-Safe", and is easily processed and does not develop when being processed or during a fire, poisonous gases. At a specific excess temperature quickly reached in the case of a fire, it forms a foam corpus all over, the thickness of which exceeds many times the original layer thickness of the application, and achieves in this manner through the volume increase caused by the intumescence during a breakdown connected with a temperature increase, for example a fire, temporarily, a blocking action in the flow path in the vicinity of the sealing point.

The intumescing material is usually filled into cartouches and is traded and processed in this form. It has been proven that such a material, which consists of fungicides, dispersing and wetting agents, softeners, antifreezing compounds, fillers, colorants, foaming agents causing the intumescence, waterproofing materials determining the blocking action of the intumescing material and binding agents, is able to be processed only for a limited time period and thereafter hardens to a rubberlike state while eliminating water. It can then in most cases be no longer removed from the cartouches and can also no longer be safely processed.

The basic purpose of the invention is to overcome this deficiency and to provide a material of the above mentioned type which can be processed unlimitedly, even when it is stored in cartouches, and has a long storage time.

SUMMARY OF THE INVENTION

The purpose is attained according to the invention by a material with the following composition in percentage by weight:
(a) 25–45% binding agents, 0–0.5% fungicides, 0.2–1% dispersing and wetting agents, 1–5% softeners and 0–2% antifreezing compounds;
(b) 20–40% fillers, 0–3% colorants,
(c) 4–6% foaming agents causing the intumescence, 16–25% waterproofing materials determining the blocking action of the intumesced sealing material, and
(d) 0.2–1.5% cellulose.

DETAILED DESCRIPTION

It was discovered that a rubberlike hardening of the material which prevented the further processing occurred through the added waterproofing materials, which have the purpose of forming a solid crust in the case of a fire and hardening the intumesced material and enabling the same to withstand even a strong water jet, which is necessary in fighting fires, and the reinforcement of the material after its increase in volume has the effect that the sealing action is maintained, even when it is directly subjected to a water jet.

In particular, the ammonium polyphosphate commonly used as a waterproofing material, and which is very suitable for that purpose, is responsible for the time-dependent hardening of the material already occurring prior to an appropriate use, because it binds the water dispersed in the binding agent, which water usually assures the easy processing ability of the material. The dispersion coagulates and breaks down through the ammonium polyphosphate, and the pastelike structure of the material is lost.

Very surprisingly, it has been shown that this effect can be overcome when a cellulose portion is added to the material, which cellulose portion binds the water of the dispersion and prevents the same from coagulation. It is furthermore remarkable that the chemical composition of the cellulose is thereby of no importance whatsoever. Its share in percentage by weight of the material is relatively small and if it lies between 0.1 and 0.5%, then good results are achieved throughout.

A particularly effective material is obtained by the chemical composition disclosed in the following Example 1.

EXAMPLE 1

The composition of a material of the invention is a (in percentage by weight):

34.3% acrylate dispersion of 65% acrylate and 35% water, (binding and bonding agent)
4.1% alkyd resin,
0.3% fungicide,
0.1% dispersing additive,
0.3% wetting agent,
2.0% polybutene (softener)
1.2% monoethylene glycol (antifreezing compound),
20% calcium carbonate
8% talcum (fillers)
5.1% swelling graphite (foaming agents),
11.7% zinc borate,
1.2% glass fibers. (waterproofing materials)
7.8% ammonium polyphosphate
0.3% cellulose, to which 4% water was added.

Such a material remains spreadable over a long period of time in cartouches and can accordingly be removed and processed without any problems.

It has proven to be particularly advantageous for the manufacture of a material of the invention when the cellulose is first mixed with water, and, after the subsequent swelling of the cellulose, the ammonium polyphosphate is added. This sequence alone decides the effectiveness of the manufacture, however, and not whether the cellulose is added alone or together with the ammonium polyphosphate to the material. Thus it is, on the one hand, possible that the cellulose is first mixed with the water and, after the following swelling, is mixed with the ammonium polyphosphate and is added in this form to the already mixed remaining parts of the material. On the other hand, it is also possible that first the cellulose and, after its swelling, the ammonium polyphosphate is added to the material already mixed from the remaining parts.

It is furthermore advantageous during the manufacture of the material of the invention that first the powdery parts are mixed and then are added to the liquidy parts, which these are best previously separately mixed.

The embodiments of the invention in which an exclusive property or privilege is claimed are defined as follows:

1. A flame-retardant material which intumesces at an elevated temperature and comprises, in percentage by weight:

25–45% of an acrylate dispersion and an alkyd resin as binding agents;

0–0.5% of a fungicide;

0.2–1% of dispersing and wetting agents;

1–5% polybutene as a softener;

0–2% monoethylene glycol as an antifreezing compound;

20–40% of fillers;

0–3% of colorants;

4–6% of swellable graphite as a foaming agent causing intumescence;

16–25% of zinc borate, glass fiber and ammonium polyphosphate as waterproofing materials; and 0.1–1.5% cellulose.

2. The fire-retardant material according to claim 1, wherein the filler comprises a mixture of 15–25% calcium carbonate and 5–10% talcum, based on the total weight of the material.

3. The fire-retardant material according to claim 2, wherein said filler comprises 20% calcium carbonate and 8% talcum.

4. The fire-retardant material according to claim 1, wherein a colorant is present and wherein iron oxide is used as the colorant.

5. The fire-retardant material according to claim 1, wherein 3–5% water is added to the cellulose, based on the total weight of the material.

6. The fire-retardant material according to claim 1, wherein the composition comprises, in percentage by weight:

38% binding and bonding agents, 0.3% fungicides, 0.4% dispersing and wetting agents, 2.0% softeners, 0.4% antifreezing compounds, 28% fillers, 1.3% colorants, 5.1% foaming agents 20.7% waterproofing materials and 0.3% cellulose.

7. The fire-retardant material according to claim 5, wherein the filler comprises a mixture of calcium carbonate and talcum.

8. The fire-retardant material according to claim 7, wherein iron oxide is used as the colorant.

9. The fire-retardant material according to claim 7, wherein said filler comprises 20% calcium carbonate and 8% talcum.

10. The fire-retardant material according to claim 6, wherein iron oxide is used as the colorant.

11. The fire-retardant material according to claim 6, wherein 3–5% water is added to the cellulose, based on the total weight of the material.

12. A flame-retardant material which intumesces at an elevated temperature and comprises, in percentage by weight:

34.3% of an acrylate dispersion;

4.1% of an alkyd resin;

0.3% of a fungicide;

0.1% of a dispersing additive;

0.3% of a wetting agent;

2.0% polybutene;

1.2% of monoethylene glycol;

28% of fillers;

5.1% of swellable graphite;

11.7% of zinc borate;

1.2% glass fiber;

7.8% ammonium polyphosphate; and 0.3% cellulose.

13. The fire-retardant material according to claim 12, wherein the filler comprises a mixture of calcium carbonate and talcum.

14. The fire-retardant material according to claim 13, wherein iron oxide is added as a colorant.

15. The fire-retardant material according to claim 13, wherein said filler comprises 20% calcium carbonate and 8% talcum.

16. The fire-retardant material according to claim 12, wherein the acrylate dispersion consists of 65% acrylate and 35% water, based on the total weight of the material.

17. The fire-retardant material according to claim 16, wherein 3–5% water is added to the cellulose, based on the total weight of the material.

18. The fire-retardant material according to claim 12, wherein 3–5% water is added to the cellulose, based on the total weight of the material.

* * * * *

UNITED STATES PATENT AND TRADEMARK OFFICE
CERTIFICATE OF CORRECTION

PATENT NO. : 6,001,285
DATED : December 14, 1999
INVENTOR(S) : Heinz-Peter Wunram It is certified that error appears in the above-identified patent and that said Letters Patent is hereby corrected as shown below:

Column 3, line 44, change " according to claim 5" to
-- according to claim 6 --.

Signed and Sealed this

Thirtieth Day of January, 2001

Attest:

Q. TODD DICKINSON

*Attesting Officer*  *Director of Patents and Trademarks*